US006723374B2

(12) United States Patent
Chen et al.

(10) Patent No.: US 6,723,374 B2
(45) Date of Patent: Apr. 20, 2004

(54) MAGNETIC RECORDING MEDIUM WITH DUAL MAGNETIC LAYERS AND HIGH IN-PLANE COERCIVITY

(75) Inventors: Qixu(David) Chen, Milpitas, CA (US); Lin Huang, San Jose, CA (US); Charles Leu, Fremont, CA (US); Rajiv Yadav Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/252,708

(22) Filed: Sep. 24, 2002

(65) Prior Publication Data

US 2003/0039863 A1 Feb. 27, 2003

Related U.S. Application Data

(62) Division of application No. 09/406,816, filed on Sep. 28, 1999, now Pat. No. 6,461,750.
(60) Provisional application No. 60/102,573, filed on Sep. 30, 1998.

(51) Int. Cl.[7] ............................. C23C 14/32; B05D 5/12
(52) U.S. Cl. ...................... 427/131; 427/128; 427/132; 204/192.1; 204/192.15; 204/192.2
(58) Field of Search ................................. 427/128, 131, 427/132; 204/192.2, 192.15, 192.1; 428/694 TM (56) References Cited

U.S. PATENT DOCUMENTS

| 5,616,218 A | 4/1997 | Alex ...................... 204/192.15 |
| 5,693,426 A | 12/1997 | Lee et al. ................... 428/611 |
| 5,763,071 A | 6/1998 | Chen et al. .................. 428/332 |
| 5,772,857 A | 6/1998 | Zhang ..................... 204/192.2 |
| 5,800,931 A | 9/1998 | Lee et al. ................... 428/611 |
| 5,851,656 A | 12/1998 | Ohkubo ..................... 428/332 |
| 6,077,586 A | 6/2000 | Bian et al. .................. 428/65.3 |
| 6,077,603 A | 6/2000 | Zhang ........................ 428/332 |
| 6,143,388 A | 11/2000 | Bian et al. .................. 428/65.3 |
| 6,150,015 A | 11/2000 | Bertero et al. .............. 428/332 |
| 6,150,016 A | 11/2000 | Song et al. .................. 428/332 |
| 6,251,532 B1 | 6/2001 | Futamoto et al. ........... 428/694 |

OTHER PUBLICATIONS

"Micromagnetic and Experimental Studies of CoPtCr Polycrystalline Thin Film Media with Bicrystal Microstructure", by Peng, et al., IEEE Transactions on Magnetics, vol. 31, No. 6, Nov. 1995, pp. 2821–2823.

"Magnetic Interaction in Co–Cr–Pt–Ta–Nb Media: Utilization of Micromagnetic Simulation", by Akimoto, et al., IEEE Transactions on Magnetics, vol. 34, No. 4, Jul. 1998, pp1. 1597–1599.

"NiAl Underlayers For CoCrTa Magnetic Thin Films", by Lee, et al., IEEE Transactions on Magnetics, vol. 30, No. 6, Nov. 1994, pp. 3951–3953.

"Role of NiAl Underlayers in Longitudinal Recording Media (Abstract)", by Ross, et al., Journal of Applied Physics: Proceedings of the 41st Annual Conference on Magnetism and Magnetic Materials, vol. 81, No. 8, Apr. 15, 1997, Part 2A.

Primary Examiner—Holly Rickman
(74) Attorney, Agent, or Firm—McDermott, Will & Emery (57) ABSTRACT

A magnetic recording media is formed with high in-plane coercivity employing dual magnetic layers. The first magnetic layer is sputter deposited in a chamber employing a shield such that the minimum incident angle of impinging atoms is relatively large, e.g., greater than about 26°. Embodiments of the present invention comprise depositing a NiAl seedlayer, a Cr or Cr alloy underlayer and a first CoCrTa magnetic layer at a thickness less than about 50 Å for inducing the preferred (10.0) crystallographic orientation in the subsequently deposited second magnetic layer, e.g., CoCrPtTa or CoCrPtTaNb having a high Cr content of about 16 to about 21 at. %.

16 Claims, 6 Drawing Sheets

MAGNETIC RECORDING MEDIUM WITH DUAL MAGNETIC LAYERS AND HIGH IN-PLANE COERCIVITY

RELATED APPLICATION

This application is a divisional of U.S. patent application Ser. No. 09/406,816, filed Sep. 28, 1999, now U.S. Pat. No. 6,461,750 which claims priority from Provisional Application Ser. No. 60/102,573 filed on Sep. 30, 1998 entitled: "UNI-CRYSTAL MEDIUM WITH A HIGH-Cr CoCrPtTa or CoCrPtTaNb MAGNETIC LAYER", the entire disclosure of which is hereby incorporated herein by reference.

TECHNICAL FIELD

The present invention relates to magnetic recording media, such as thin film magnetic recording disks, to a method of manufacturing the media and to an apparatus employed to manufacture the media. The present invention has particular applicability to high areal density longitudinal magnetic recording media exhibiting low media noise and enhanced magnetic performance.

BACKGROUND ART

Magnetic recording media are extensively employed in the computer industry and can be locally magnetized by a write transducer or write head to record and store information. The write transducer creates a highly concentrated magnetic field which alternates direction based upon bits of the information being stored. When the local magnetic field produced by the write transducer is greater than the coercivity of the recording medium, grains of the recording medium at that location are magnetized. The grains retain their magnetization after the magnetic field produced by the write transducer is removed. The direction of the magnetization matches the direction of the applied magnetic field. The magnetization of the recording medium can subsequently produce an electrical response to a read sensor, allowing the stored information to be read.

There is an ever increasing demand for magnetic recording media with higher storage capacity, lower noise and lower costs. Efforts, therefore, have been made to reduce the size required to magnetically record bits of information, while maintaining the integrity of the information as size is decreased. The space necessary to record information in magnetic recording media depends upon the size of transitions between oppositely magnetized areas. It is, therefore, desirable to produce magnetic recording media that will support the smallest transition size possible. However, the output from small transition sizes must avoid excessive noise to reliably maintain the integrity of the stored information. Media noise is generally expressed in signal-to-noise ratio (SMNR).

The increasing demands for higher areal recording density impose increasingly greater demands on thin film magnetic recording media in terms of remanent coercivity (Hr), magnetic remanance (Mr), coercivity squareness (S*), medium noise, i.e., SMNR, and narrow track recording performance. It is extremely difficult to produce a magnetic recording medium satisfying such demanding requirements.

The linear recording density can be increased by increasing the Hr of the magnetic recording medium. This objective must be accompanied by a decrease in the medium noise, as by maintaining very fine magnetically non-coupled grains. Medium noise in thin films is a dominant factor restricting increased recording density of high density magnetic hard disk drives, and is attributed primarily to big and inhomogeneous grain size and intergranular exchange coupling. Accordingly, in order to increase linear density, medium noise must be minimized by suitable microstructure control.

Longitudinal magnetic recording media containing cobalt (Co) or Co-based alloy magnetic films with a chromium (Cr) or Cr alloy underlayer deposited on a non-magnetic substrate have become the industry standard. For thin film longitudinal magnetic recording media, the desired crystallized structure of the Co and Co alloys is hexagonal close packed (hcp) with uniaxial crystalline anisotropy and a magnetization easy direction along the c-axis is in the plane of the film. The better the in-plane c-axis crystallographic texture, the more suitable is the Co alloy thin film for use in longitudinal recording to achieve high remanance. For very small grain sizes coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains. This type of microstructural and crystallographic control is typically attempted by manipulating the deposition process, and proper use of underlayers and seedlayers.

Underlayers can strongly influence the crystallographic orientation, grain size and chemical segregation of the Co alloy grain boundaries. Conventional underlayers include Cr and alloys of Cr with elements such as titanium (Ti), tungsten (W), molybdenum (Mo) and vanadium (V).

There are other basic characteristics of magnetic recording media, aside from SMNR, that are indicative of recording performance, such as half-amplitude pulse width (PW50), overwrite (OW), and modulation level. A wide PW50 indicates that readback pulse from adjacent bits are crowded together resulting in interference which limits the linear packing density of bits in a given track and, hence, reduces packing density in a given area thereby limiting the recording capacity of the magnetic recording medium. Accordingly, a narrow PW50 is desirable for high areal recording density.

OW is a measure of the ability of the magnetic recording medium to accommodate overwriting of existing data. In other words, OW is a measure of what remains of a first signal after a second signal, e.g., at a different frequency, has been written over it on the medium. OW is considered low or poor when a significant amount of the first signal remains.

It is extremely difficult to obtain optimum performance from a magnetic recording medium by optimizing each of the PW50, OW, SMNR and modulation level, as these performance criteria are interrelated and tend to be offsetting. For example, if coercivity is increased to obtain a narrower PW50, OW is typically adversely impacted, as increasing coercivity typically degrades OW. A thinner medium having a lower Mr×thickness (Mrt) yields a narrower PW50 and better OW; however, SMNR decreases since the medium signal is typically reduced if the electronic noise of the system is high. Increasing the squareness of the hysteresis loop contributes to a narrower PW50 and better OW; however, noise may increase due to intergranular exchange coupling and magnetostatic interaction. Thus, a formidable challenge is present in optimizing magnetic performance in terms of PW50, OR, SMNR and modulation level.

It is recognized that the magnetic properties, such as Hr, Mr, S* and SMNR, which are critical to the performance of a magnetic alloy film, depend primarily upon the microstructure of the magnetic layer which, in turn, is influenced by the underlying layers, such as the underlayer. It is also recognized that underlayers having a fine grain structure are highly desirable, particular for growing fine grains of hcp Co alloys deposited thereon.

The majority of current conventional longitudinal magnetic recording media exhibit a bi-crystal cluster structure comprising a Co alloy with a (1.0) texture or crystallographic orientation epitaxially grown on a Cr-containing underlayer exhibiting a (200) texture. A bi-crystal cluster structure is characterized by two Co subgrains with an easy axis perpendicular to each other.

It has been reported that nickel-aluminum (NiAl) films exhibit a grain size which is smaller than similarly deposited Cr films, and can be employed to produce magnetic recording media with a Co-alloy having a (10.0) texture grown on the underlayer with a (112) texture forming the so called "uni-crystal" structure. Li-Lien Lee et al., "NiAl Underlayers For CoCrTa Magnetic Thin Films", IEEE Transactions on Magnetics, Vol. 30, No. 6, November, 1994, pp. 3951–3953, and U.S. Pat. No. 5,693,426 issued to Li-Lien Lee et al. The "uni-crystal" structure is characterized by Co grains having an easy axis randomly distributed in the film plane. Accordingly, NiAl thin films are potential candidates as underlayers for magnetic recording media for high density longitudinal magnetic recording. However, it was found that the coercivity of a magnetic recording medium comprising an NiAl underlayer is too low for high density recording, e.g. about 2,000 Oersteds (Oe). The use of a NiAl underlayer is also disclosed by C. A. Ross et al., "The Role Of An NiAl Underlayers In Longitudinal Thin Film Media", J. Appl. Phys. 81(8), P.4369, 1997. NiAl underlayers are also disclosed by Lee et al. in U.S. Pat. No. 5,693,426 and Lee et al. in U.S. Pat. No. 5,800,931. A magnetic recording medium comprising a NiAl seedlayer under a Cr underlayer is disclosed by Zhang in U.S. Pat. No. 5,858,566.

The effective crystal anisotropy constant of the bi-crystal cluster structure media is less than the intrinsic crystal anisotropy constant, leading to a lower coercivity than that of uni-crystal media, Qingzhi Peng et al., "Micromagnetic and Experimental Studies of CoPtCr Polycrystalline Thin Film Media with Bicrystal Microstructure", IEEE Transactions on Magnetics, Vol. 31, No. 6, November, 1995, pages 2821–2823. With increasing recording density, higher coercivity is required.

Cobalt-chromium-platinum-tantalum-niobium (CoCrPtTaNb) magnetic alloys had been reported. See, for example, H. Akimoto et al., "Magnetic Interaction in Co—Cr—Pt—Ta—Nb Media; Utilization of Micromagnetic Simulation", IEEE Transactions on Magnetics, Vol. 34 No. 4, July 1998, pages 1597–1599. CoCrPtTaNb and CoCrPtTa magnetic alloys with a high-Cr concentration, e.g., about 16 to about 21 at.%, are suitable candidates for high density magnetic recording media due to their high coercivity and low noise performances.

However, media containing such high-Cr CoCrPtTaNb or CoCrPtTa magnetic alloys deposited on Cr-containing underlayers on a NiAl seedlayer do not develop the desired uni-crystal structure employing an in-line pass-by sputtering system, particularly when the Cr-containing underlayer is about 100 Å or less in order to preserve a small underlayer grain size.

In U.S. Pat. No. 5,762,071 issued to Chen et al., magnetic recording media are disclosed comprising a dual magnetic layer of CoCrTa and CoCrPtTa on a Cr-containing underlayer for improved magnetic performance of a bi-crystal cluster media. Alex, in U.S. Pat. No. 5,616,218 discloses a sputtering system comprising a collimator for varying the deposition rate, arrival energy of particles and angular distribution of particles to affect the crystal texture of an underlayer in manufacturing a magnetic recording medium. Zhang, in U.S. Pat. No. 5,772,857, discloses a magnetic recording medium comprising dual magnetic films of CoCrTaPt on CoCrTa. Ohkubo, in U.S. Pat. No. 5,851,656, discloses a magnetic recording media comprising multiple magnetic layers with an intermediate non-magnetic Cr alloy layer.

There exists a need for high areal density longitudinal magnetic recording media exhibiting high Hr, high SMNR and high in-plane coercivity. There exists a particular need for magnetic recording media containing a high-Cr CoCrPtTaNb or CoCrPtTa magnetic alloy and exhibiting a uni-crystal structure with high in-plane coercivity.

DISCLOSURE OF THE INVENTION

An advantage of the present invention is a magnetic recording medium for high areal recording density exhibiting low noise, and high in-plane coercivity.

Another advantage of the present invention is a magnetic recording medium for high areal recording density containing a high-Cr CoCrPtTaNb or CoCrPtTa magnetic alloy and exhibiting a uni-crystal structure with high in-plane coercivity.

A further advantage of the present invention is an apparatus for manufacturing a magnetic recording medium for high areal recording density with a uni-crystal structure exhibiting low noise and high in-plane coercivity containing a high-Cr CoCrPtTaNb or CoCrPtTa magnetic alloy.

Another advantage of the present invention is a method of manufacturing a magnetic recording medium suitable for high areal recording density with a uni-crystal structure exhibiting low noise and high in-plane coercivity comprising a high-Cr CoCrPtTaNb or CoCrPtTa magnetic alloy.

Additional advantages and features of the present invention will be set forth in part in the description which follows and in part will become apparent to those having ordinary skill in the art upon examination of the following only to be learned from the practice of the present invention. The advantages of the present invention may be realized and obtained and particularly pointed out in the appended claims.

According to the present invention, the foregoing and other advantages are achieved by a magnetic recording medium comprising: a non-magnetic substrate; a nickel-aluminum (NiAl) seedlayer on the substrate, a chromium (Cr) or Cr alloy underlayer on the seedlayer; a first cobalt chromium tantalum (CoCrTa) magnetic layer on the underlayer and a second magnetic layer on the first CoCrTa magnetic layer.

Another aspect of the present invention is a method of manufacturing a magnetic recording medium, the method comprising: depositing a NiAl seedlayer on a non-magnetic substrate; depositing a Cr or Cr alloy underlayer on the NiAl seedlayer; depositing a first CoCrTa magnetic layer on the underlayer and depositing a second magnetic layer on the first CoCrTa magnetic layer.

A further aspect of the present invention is an apparatus for manufacturing a magnetic recording medium, the apparatus comprising: a conveyor for moving a non-magnetic substrate by a plurality of sputter deposition chambers; a chamber for sputter depositing a NiAl seedlayer on the non-magnetic substrate; a chamber for sputter depositing a Cr or Cr alloy underlayer on the seedlayer; a chamber for sputter depositing a first CoCrTa magnetic layer on the underlayer; and a chamber for sputter depositing a second magnetic layer on the first CoCrTa magnetic layer.

Embodiments of the present invention comprise depositing a CoCrPtTaNb or CoCrPtTa magnetic alloy containing about 16 to about 21 at.% Cr on the first CoCrTa magnetic layer. Embodiments of the present invention further comprise sputter depositing the first CoCrTa magnetic alloy in an in-line pass-by sputtering apparatus containing a sputtering chamber with a shield positioned such that the minimum angle of incidence of impinging atoms is no less than about 26°, whereby the ratio of perpendicular coercivity over in-plane coercivity of the magnetic recording medium is less than about 0.5, e.g., less than about 0.4. The CoCrTa magnetic alloy layer is typically deposited at a thickness of about 2 Å to about 50 Å and enhances the (10.0) crystallographic orientation of the second magnetic layer such that the second magnetic layer exhibits a predominant uni-crystal structure.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature and not as restrictive.

DESCRIPTION OF THE INVENTION

The present invention provides magnetic recording media suitable for high areal longitudinal recording density exhibiting improved magnetic properties, such as high Hr, high SMNR, high OW, narrow PW50 and small jitter. Significantly, magnetic recording media in accordance with the present invention exhibit high in-plane coercivity vis-à-vis conventional magnetic recording media. The present invention achieves these technological advantages by providing a magnetic recording medium exhibiting a uni-crystal structure utilizing a dual magnetic layer comprising a CoCrTa magnetic layer in combination with another magnetic layer, such as a high-Cr CoCrPtTaNb or CoCrPtTa alloy. Embodiments of the present invention comprise a magnetic recording medium containing a NiAl seedlayer, and a Cr-containing underlayer. Embodiments of the present invention further comprise an apparatus enabling sputter depositing of the first CoCrTa magnetic alloy such that (0002) crystallographic orientation is suppressed in the subsequently deposited magnetic layer and a uni-crystal medium is obtained with a ratio of perpendicular coercivity over in-plane coercivity of less than 0.5 e.g., less than about 0.4, even less than about 0.3.

The first magnetic layer of the inventive magnetic recording media comprises CoCrTa, typically containing about 12 to about 20 at.% Cr and about 1 to about 8 at.% Ta. The first CoCrTa magnetic layer suppresses Co (0002) crystallographic orientation in the subsequently deposited magnetic layers, e.g., a high-Cr CoCrPtTa or CoCrPtTaNb layer, and enhances the preferred (10.0) crystallographic orientation of the subsequently deposited magnetic layer. The (10.0) crystallographic orientation is induced by the Cr (112) crystallographic orientation.

The uni-crystal structure of the second magnetic layer in accordance with embodiments of the present invention is characterized by cobalt grains having an easy axis randomly distributed in the film plane vis-à-vis a bi-crystal cluster structure wherein two cobalt subgrains have an easy axis perpendicular to each other. The formation of a uni-crystal structure advantageously provides high coercivity with a desirable small grain size attributed to, in part, the NiAl seedlayer.

Conventional in-line pass-by sputtering systems do not readily yield a uni-crystal structure. Such conventional systems comprise magnetic layer sputter deposition chambers comprising a shield such that the minimum angle of incidence of impinging atoms from the target is typically less than about 24°, e.g., about 22.6°. It was found that such conventional systems create a shadowing effect adversely impacting the growth mechanism with respect to the formation of a uni-crystal structure. Upon experimentation and investigation, it was found that if the minimum impinging angle is small, the growth mechanism of the magnetic layer proceeded in a columnar manner with grains tilted with respect to the substrate rather than substantially perpendicular to the substrate. Growth substantially perpendicular to the substrate results in a decrease of the amount of grains with easy axis perpendicular to film plane and, hence, increases the amount of grains with in-plane easy axis. Accordingly, embodiments of the present invention comprise an apparatus with a sputter deposition chamber for the first CoCrTa magnetic alloy layer containing a shield structured such that the angle of incidence to the substrate of impinging atoms is greater than about 26°, such as about 26° to about 40°, e.g., about 28.5°. In this way, the growth of the deposited CoCrTa layer is enhanced in the perpendicular direction, thereby reducing the ratio of perpendicular coercivity over in-plane coercivity of the resulting magnetic recording medium to less than about 0.5, e.g., less than about 0.4.

The NiAl seedlayer, in accordance with the present invention, can be deposited at a suitable thickness, such as about 200 Å to about 2,000 Å, e.g., about 400 to about 1,000 Å. Suitable NiAl seedlayers, in accordance with the present invention, can comprise about 41 to about 55 at.% Al. The first CoCrTa magnetic layer can be deposited at a suitable thickness, such as about 2 Å to about 50 Å, e.g., about 4 Å to about 15 Å. The Cr or Cr alloy underlayer can be deposited at a suitable thickness, such as about 20 Å to about 200 Å, about 25 Å to about 100 Å. The second magnetic layer can be deposited at a suitable thickness, such as about 100 Å to about 300 Å, e.g., about 150 Å to about 250 Å. Suitable second magnetic layers include a CoCrPtTaNb magnetic alloy layer containing about 16 to about 21 at.% Cr, about 5 to about 13 at.% Pt, about 1 to about 8 at.% Ta and about 1 to about 8 at.% Nb. Suitable CoCrPtTa alloys contain about 16 to about 21 at.% Cr, about 5 to about 13 at.% Pt, and about 1 to about 8 at.% Ta. The first CoCrTa magnetic layer, sputter deposited at a minimal angle of incidence of impinging atoms of about 26° significantly enhances the magnetic performance of the resulting uni-crystal magnetic recording medium.

Embodiments of the present invention include the use of various substrates conventionally employed in the manufacture of magnetic recording media, such as aluminum (Al) and Al alloys, including Al and Al alloys plated with a layer of nickel-phosphorous (Ni—P), glass, ceramic and glass-ceramic materials. Suitable underlayers for use in the present invention comprise Cr and Cr alloys containing about 50 to about 100 at.% Cr, e.g. chromium molybdenum (CrMo), chromium manganese (CrMn), chromium venadium (CrV) or chromium tungsten (CrW). Embodiments of the present invention further comprise depositing a conventional carbon-containing protective overcoat on the second magnetic layer, as by sputtering, and depositing a conventional lubricant topcoat on the carbon-containing protective overcoat.

Figure 1:
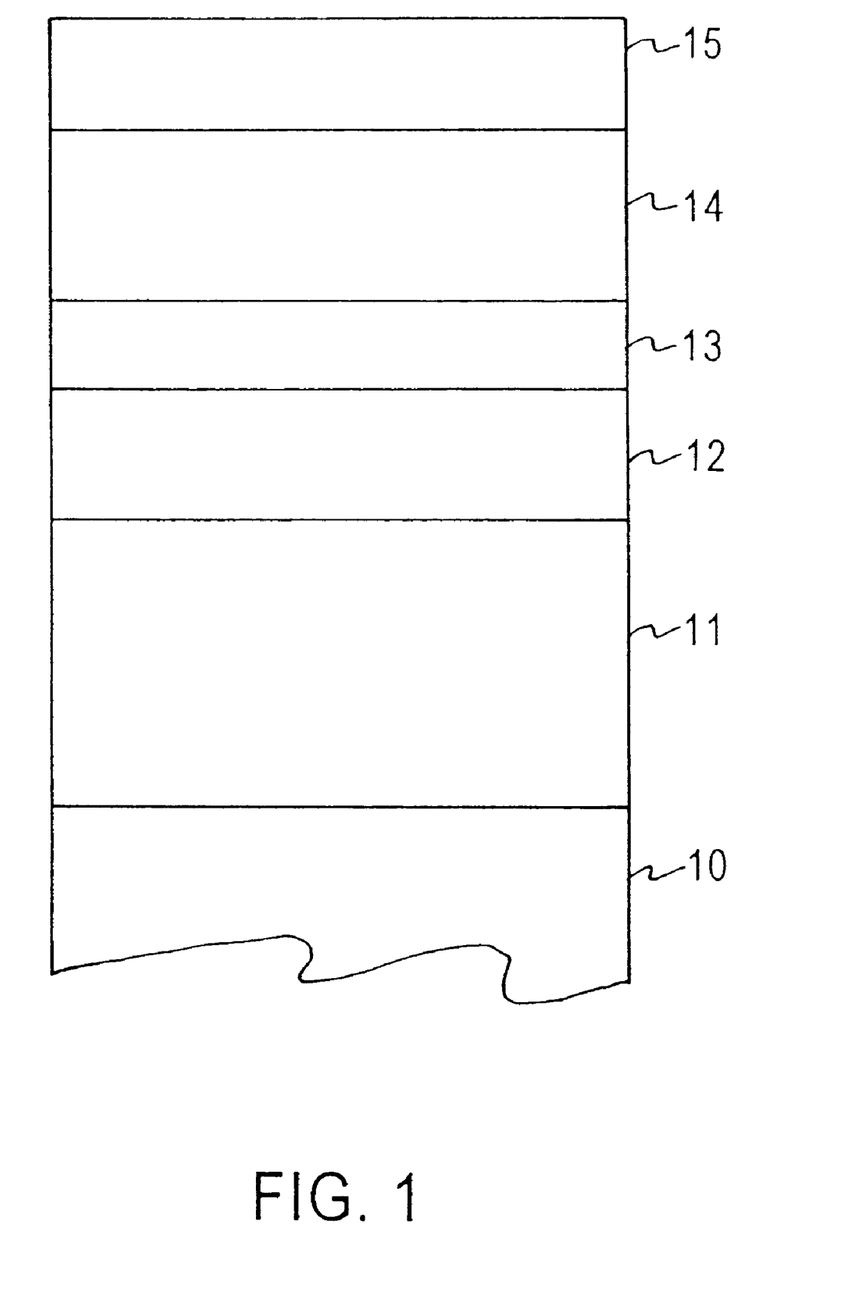
FIG. 1 schematically depicts a magnetic recording medium in accordance with an embodiment of the present invention.

An embodiment of the present invention is schematically illustrated in FIG. 1 and comprises substrate 10, e.g., a conventional Al, or, glass or glass-ceramic substrate, NiAl seedlayer 11, Cr-containing underlayer 12, first CoCrTa magnetic layer 13, second magnetic layer 14, e.g., CoCrPt-TaNb or CoCrPtTa, and a carbon-containing protective overcoat 15. As in conventional practices, a lubricant topcoat (not shown) is deposited on the protective overcoat 15. It should be recognized that layers 11, 12, 13, 14, 15 as well as the lubricant topcoat are sequentially deposited on both sides of non-magnetic substrate 10.

Experimental testing was conducted to determine the impact of the thickness of the first CoCrTa magnetic layer on the magnetic properties and recording performances of magnetic recording media with the structure NiAl/Cr/CoCrTa/CoCrPtTaNb representative of an embodiment of the present invention exhibiting a uni-crystal structure. The samples were deposited with an in-line pass-by sputter system employing direct current (DC) magnetron sputtering. The macromagnetic properties shown in FIGS. 2A, 2B, 2C were measured with a rotating disc magnetometer (RDM). The recording performances were measured at 270 KFCI (kiloflux reversal per inch) with a magnetoresistive (MR) head and a Guzik 1701 spinstand connected to a 1601 read-write analyzer and a Hewlett Packard spectrum analyzer. Sr* denotes remanent coercivity squareness; Hr denotes remanent coercivity; Mrt is the product of remanence and the thickness of the magnetic layer; and dHr and dMrt are the ratios of the differences of the maximum and minimum along a track over the track average of Hr and Mrt, respectively. The film thicknesses and target composition in atomic percentage are shown in Table I below. The Mrt of the samples was kept at about 0.42 memu/cm$^2$. NiP-plated Al substrates were employed.

TABLE I

Figure 2A:
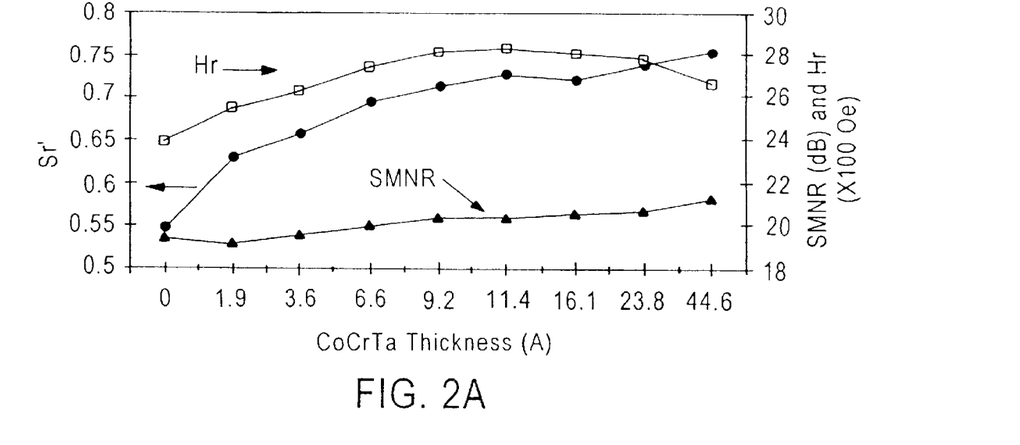
FIGS. 2A, 2B and 2C show the dependence of SMNR, OW and PW50, respectively on the thickness of the first CoCrTa magnetic layer.
Figure 2B:
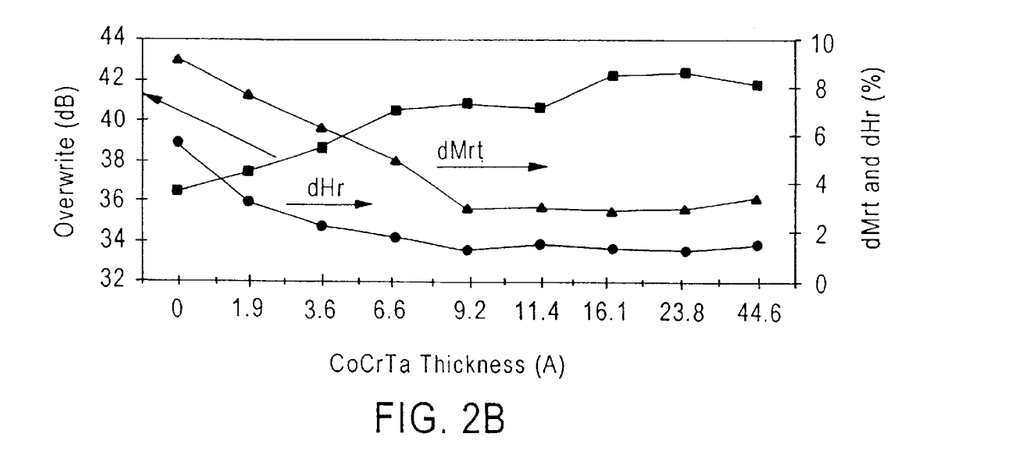
Figure 2C:
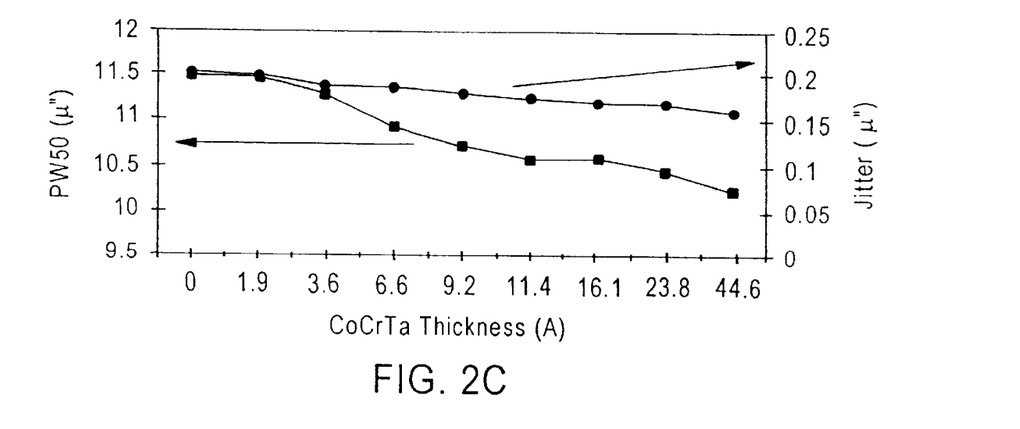

| Film | NiAl | Cr | CoCrTa | CoCrPtTaNb |
|---|---|---|---|---|
| Composition (%) | 50-50 | 100 | 80-16-4 | 67.5-19-9.5-2-2 |
| Thickness (Å) | 390 | 100 | varied | varied |

It should be apparent from FIGS. 2A, 2B and 2C that the recording performances of media according to the present invention, e.g., Sr*, OW and PW$_{50}$, FIGS. 2A, 2B and 2C, respectively, are significantly better vis-à-vis media with a single magnetic layer. Indeed, as shown in FIGS. 2A, 2B and 2C, media with dual magnetic layers and Cr-containing underlayers deposited on NiAl seedlayers exhibit much higher Hr, Sr* and SMNR (FIG. 2A), much higher OW and much smaller modulation dMrt and dHr (FIG. 2B) and much narrower PW$_{50}$ and much smaller jitter (FIG. 2C).

Figure 3:
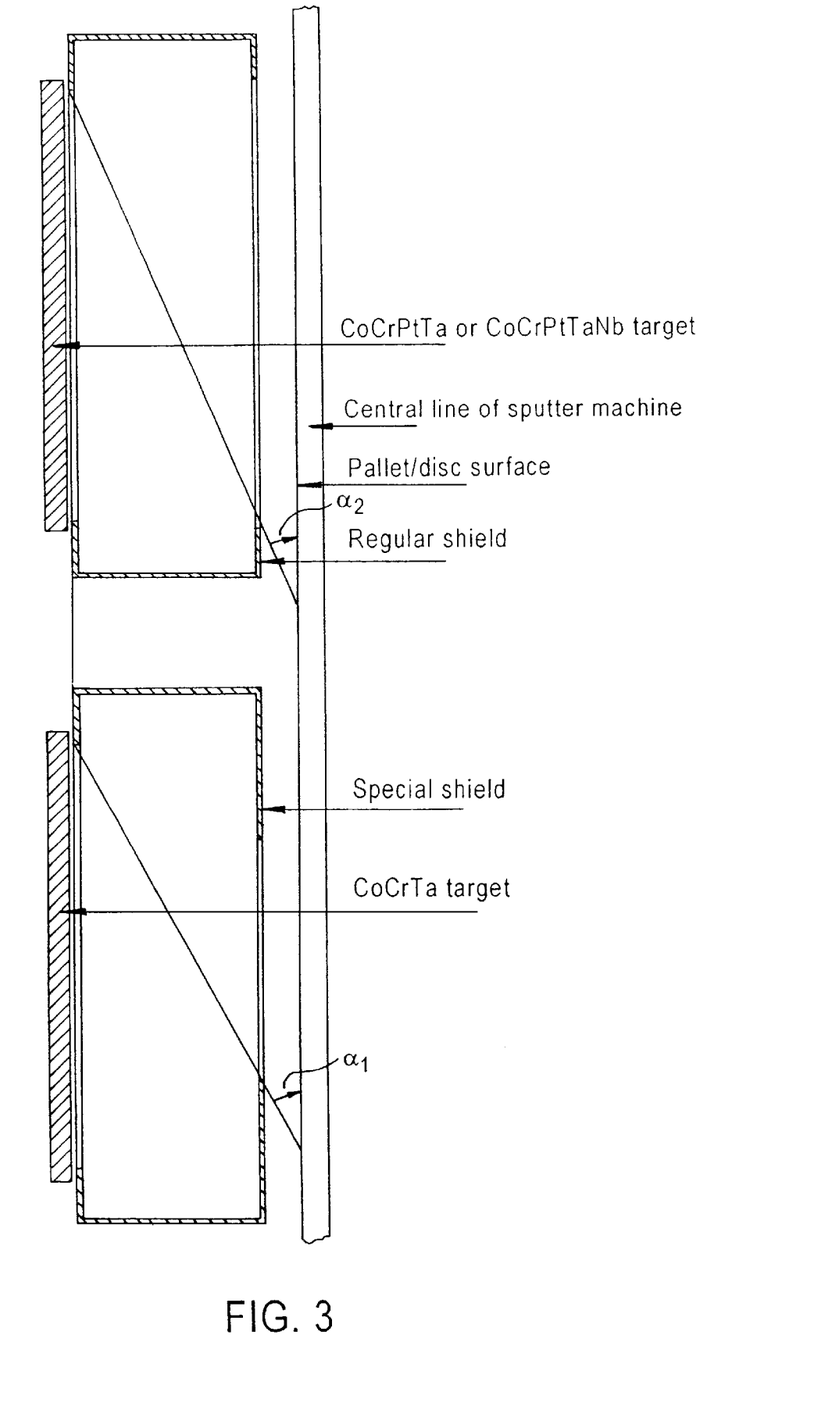
FIG. 3 is a cross sectional illustration of a portion of an apparatus in accordance with an embodiment of the present invention.

FIG. 3 illustrates the geographic relationship of the shield in the sputter deposition chamber for depositing the second magnetic layer, e.g., the CoCrPtTa or CoCrPtTaNb layer and the shield for the first CoCrTa layer. As shown in FIG. 3, the opening for depositing the first CoCrTa magnetic layer is significantly narrower than the opening for depositing the second magnetic layer. As also shown in FIG. 3, the minimum incident angle for depositing the first CoCrTa magnetic layer $\alpha_1$ is about 28.5°, while the minimum incident angle of $\alpha_2$ for depositing the second magnetic layer is about 22.6°. Advantageously, since the thickness of the first CoCrTa layer is significantly less than that of the second magnetic layer, the shielding for depositing the CoCrTa magnetic layer does not reduce manufacturing throughput. By increasing the angle $\alpha_1$, the degree of perpendicular growth is increased, thereby decreasing the amount of grains with perpendicular easy axis. Accordingly, magnetic recording media exhibiting a low ratio of perpendicular coercivity over in-plane coercivity are achieved, such as about 0.3, e.g., less than about 0.4.

Figure 4A:
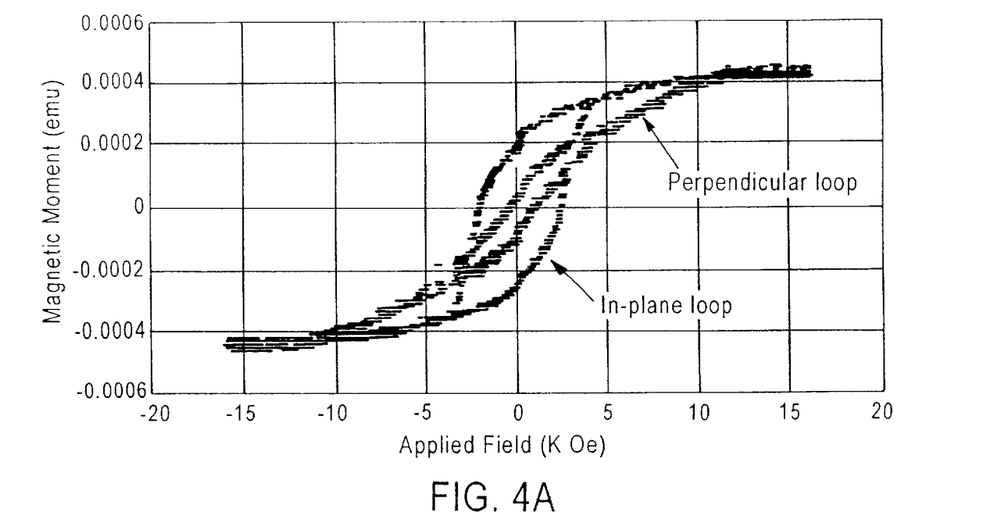
FIGS. 4A and 4B show a comparison of hysteresis loops of a magnetic recording medium containing dual and single magnetic layers, respectively.
Figure 4B:
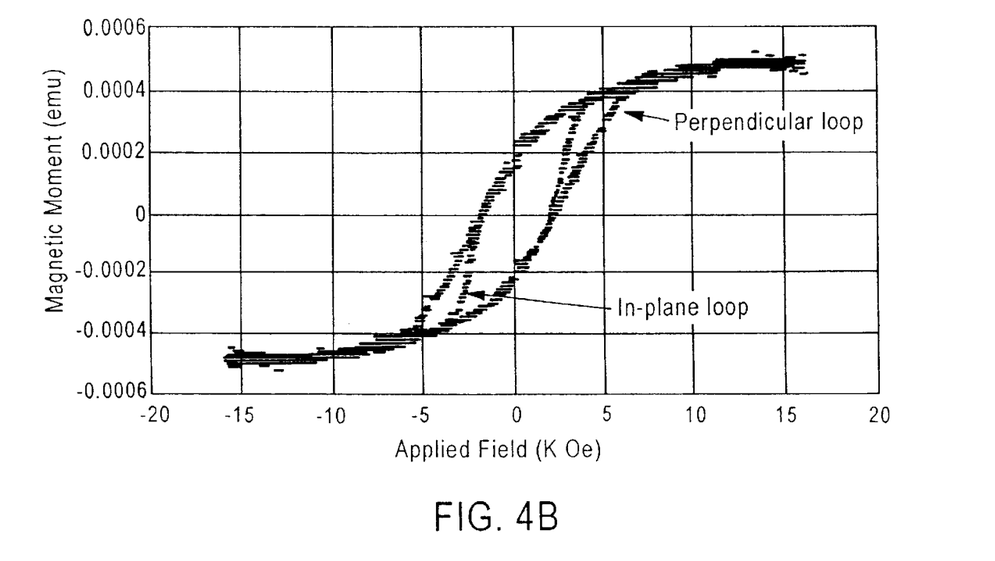

As shown in FIGS. 2A, 2B and 2C, magnetic recording performances of media in accordance with the present invention containing a dual magnetic layer are superior vis-à-vis media with a single magnetic layer. Such differences in performance can be appreciated by comparing the hysteresis loops, measured with a vibrating sample magnetometer (VSM) of magnetic recording media of the structure NiAl/CrMo/CoCrTa/CoCrPtTaNb in accordance with the present invention (FIG. 4A) vis-à-vis magnetic recording media having the structure NiAl/CrMo/CoCrPtTaNb (FIG. 4B). The media with dual magnetic layers with 27 Å of CoCrTa exhibit typical hysteresis loops of longitudinal recording media. The hysteresis loop of media with a single CoCrPt-TaNb magnetic layer (FIG. 4B) demonstrates that significant amounts of the grains in the magnetic film have perpendicular easy axis. The coercivity of the perpendicular and in-plane loops of the single CoCrPtTaNb magnetic layer medium as shown in FIG. 4B are 1897 and 1861 Oe, respectively. The ratio of perpendicular coercivity over in-plane coercivity of this medium is 1.02. This relatively high ratio of perpendicular coercivity over in-plane coercivity is one of the reasons why media with a single high-Cr CoCrPtTaNb magnetic layer have low Hr and poor recording performance. However, the coercivity of the perpendicular and in-plane loops of the dual magnetic layer media shown in FIG. 4A are 680 and 2276 Oe, respectively. The ratio of perpendicular coercivity over in-plane coercivity of this medium is 0.30. The relatively low ratio of perpendicular coercivity over in-plane coercivity exhibited by magnetic recording media of the present invention results in high Hr and superior recording performance.

Figure 5A:
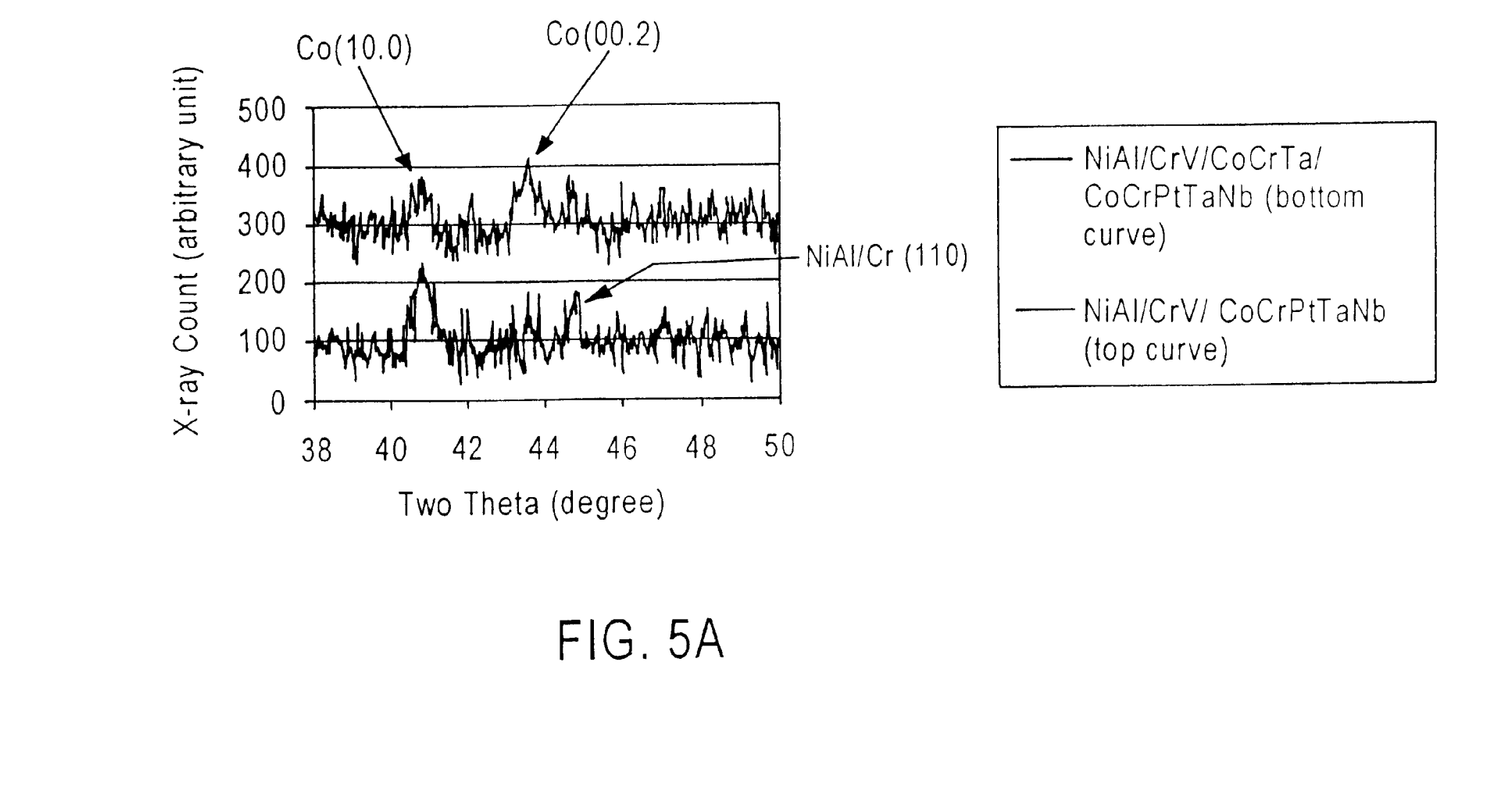
FIGS. 5A and 5B show X-ray diffraction (XRD) patterns of media with dual and single magnetic layers deposited on glass-ceramic and NiP/Al substrates, respectively.
Figure 5B:
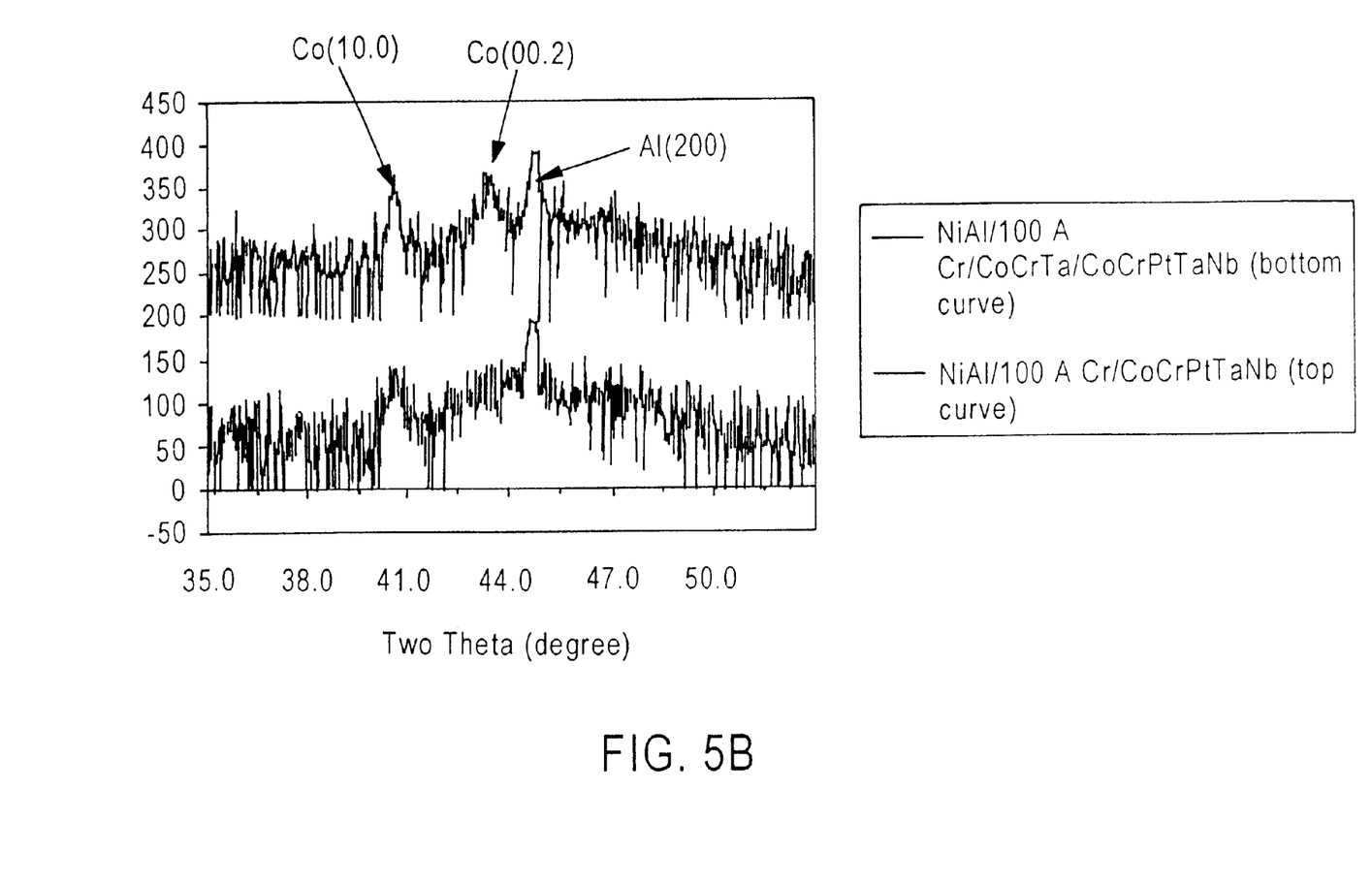

FIGS. 5A and 5B show XRD patterns of two types of media deposited on glass-ceramic substrates (FIG. 5A) and NiP/Al substrates (FIG. 5B). The XRD patterns were measured with a Scintag x-ray diffractometer operating at theta-two-theta mode. The media deposited on NiP/Al substrates are those illustrated in FIGS. 2A, 2B and 2C. The media deposited on glass-ceramic substrates had a NiAl seedlayer with a thickness of about 520 Å, a CrV underlayer with a thickness of about 110 Å containing about 80 at.% Cr and about 20 at.% V, and a CoCrPtTaNb magnetic layer with a composition as set forth in Table I. The XRD patterns show that media with dual magnetic layers exhibit typical uni-crystal structure and the media with single magnetic layers exhibit excessive undesirable, Co (00.2) crystallographic orientation. The evidence clearly demonstrates that the first CoCrTa magnetic layer of the present invention, sputter deposited employing a shield with a higher minimum incident angle of impinging atoms, inhibits the growth of perpendicular crystallographic orientation in the subsequently deposited CoCrPtTaNb films and facilitates formation of the uni-crystal texture.

The film structure of NiAl/CoCrTa/CoCrPtTaNb, which does not include a Cr-containing underlayer, does not perform well for in-line pass-by sputter systems as demonstrated in Table II and Table III below. Table II provides a comparison of macromagnetic properties of NiAl/CoCrTa/CoCrPtTaNb and NiAl/CrMo/CoCrTa/CoCrPtTaNb media deposited on glass-ceramic substrates measured with a remanent moment magnetometer (RMM). The film composition in atomic percentage is 90/10 for CrMo, 82/14/4 for CoCrTa, and 69/19/8/2/2 for CoCrPtTaNb. The coercivity of the former media is significantly lower than that of NiAl/CrMo/CoCrTa/CoCrPtTaNb media.

TABLE II

| Sample | Hr Oe | Mrt memu/cm$^2$ | NiAl thickness Å | CrMo thickness Å | CoCrTa thickness Å |
|---|---|---|---|---|---|
| A | 1894 | 0.57 | 350 | 0 | 17 |
| B | 1627 | 0.6 | 350 | 0 | 34 |
| C | 1363 | 1.01 | 350 | 0 | 170 |
| D | 2686 | 0.63 | 350 | 88 | 17 |

Table III shows a comparison of the macromagnetic properties and recording performances of NiAl/CoCrTa/CoCrPtTaNb and NiAl/CrV/CoCrTa/CoCrPtTaNb media deposited on glass substrates. The macromagnetic properties were measured with a RDM. The film composition is listed in Table I, except for the 80/20 CrV underlayer. The recording performances were measured at 260 KFCI. The magnetic and recording performances of the media with the structure of NiAl/CrV/CoCrTa /CoCrPtTaNb media are significantly better than those of NiAl/CoCrTa/CoCrPtTaNb media.

TABLE III

| Sample | Hr Oe | Mrt memu/cm$^2$ | SMNR dB | PW$_{50}$ $\mu$" | modulation % | NiAl thickness Å | CrV thickness Å |
|---|---|---|---|---|---|---|---|
| E | 2310 | 0.594 | 21.45 | 11.3 | 10.7 | 293 | 122 |
| F | 2025 | 0.558 | 19.4 | 12.2 | 16.5 | 586 | 0 |

The present invention provides magnetic recording media which exhibit better performance than media without the first CoCrTa magnetic layer and superior to media without Cr-containing underlayers. The present invention strategically employs high-Cr CoCrPtTa and CoCrPtTaNb magnetic layers and a strategic in-line pass-by sputtering system with shielding such that the deposited first CoCrTa magnetic layer reduces Co (00.2) crystallographic orientation in the subsequently deposited magnetic layers, e.g., CoCrPtTa or CoCrPtTaNb. The strategic utilization of the first CoCrTa, in accordance with the present invention, facilitates obtainment and superior performance of uni-crystal media.

The present invention advantageously provides high areal recording density longitudinal magnetic recording media exhibiting high SMNR, narrow PW50, high OW, and high Hr. The present invention enjoys particular applicability in longitudinal magnetic recording media configurations employing various non-magnetic substrates. The present invention is applicable to the production of various types of magnetic recording media, and is not limited to any particular substrate material, underlayer, magnetic layer, protective overcoat or lubricant topcoat.

Only certain embodiments of the present invention and but a few examples of its versatility are shown and described in the present disclosure. It is to be understood that the present invention is capable of use in various other combinations and in environments, and is capable of changes and modifications within the scope of the inventive concept as expressed herein.

What is claimed is:

1. A method of manufacturing a magnetic recording medium, the method comprising: depositing a nickel aluminum (NiAl) seedlayer on a non-magnetic substrate;
   depositing a chromium (Cr) or Cr alloy underlayer on the NiAl seedlayer;
   depositing a first cobalt chromium tantalum (CoCrTa) magnetic layer on the underlayer; and
   depositing a second magnetic layer on the first CoCrTa magnetic layer, wherein the ratio of perpendicular coercivity over in-plane coercivity of the magnetic recording medium is less than about 0.5.

2. The method according to claim 1, comprising depositing a second magnetic layer comprising cobalt chromium platinum tantalum (CoCrPtTa) or cobalt chromium platinum tantalum niobium (CoCrPtTaNb).

3. The method according to claim 2, wherein the second magnetic layer contains about 16 to about 21 at. % Cr.

4. The method according to claim 2, wherein the ratio of perpendicular coercivity over in-plane coercivity of the magnetic recording media is less than about 0.4.

5. The method according to claim 4, comprising sputter depositing the first CoCrTa magnetic layer at a minimum angle of incidence of impinging atoms of not less than about 26°.

6. The method according to claim 5, comprising sputter depositing the first CoCrTa magnetic layer at a thickness of about 2 Å to about 50 Å, wherein the first CoCrTa magnetic layer enhances the (10.0) crystallographic orientation of the second magnetic layer.

7. The method according to claim 5, wherein the second magnetic layer exhibits a predominant uni-crystal structure comprising cobalt grains wherein the easy axis is randomly distributed in the film plane.

8. A method of manufacturing a magnetic recording medium, the method comprising:
   depositing a nickel aluminum (NiAl) seedlayer on a non-magnetic substrate;
   depositing a chromium (Cr) or Cr alloy underlayer on the NiAl seedlayer;

sputter depositing a first cobalt chromium tantalum (CoCrTa) magnetic layer on the underlayer;

controlling the angle of incidence to the substrate of impinging atoms during sputter depositing the first CoCrTa magnetic layer to enhance growth of the deposited CoCrTa layer in the perpendicular direction, thereby reducing the ratio of perpendicular coercivity over in-plane coercivity of the magnetic recording medium; and sputter depositing a second magnetic layer on the first CoCrTa magnetic layer, wherein the second magnetic layer exhibits a predominant uni-crystal structure comprising cobalt grains wherein the easy axis is randomly distributed in the film plane.

9. A method of manufacturing a magnetic recording medium, the method comprising:

depositing a nickel aluminum (NiAl) seedlayer on a non-magnetic substrate;

depositing a chromium (Cr) or Cr alloy underlayer on the NiAl seedlayer;

sputter depositing a first cobalt chromium tantalum (CoCrTa) magnetic layer on the underlayer;

controlling the angle of incidence to the substrate of impinging atoms during sputter depositing the first CoCrTa magnetic layer to enhance growth of the deposited CoCrTa layer in the perpendicular direction, thereby reducing the ratio of perpendicular coercivity over in-plane coercivity of the magnetic recording medium; and sputter depositing a second magnetic layer comprising cobalt chromium platinum tantalum (CoCrPtTa) or cobalt chromium platinum tantalum niobium (CoCrPtTaNb).

10. The method according to claim 9, wherein the second magnetic layer contains about 16 to about 21 at. % Cr.

11. A method of manufacturing a magnetic recording medium, the method comprising;

depositing a nickel aluminum (NiAl) seedlayer on a non-magnetic substrate;

depositing a chromium (Cr) or Cr alloy underlayer on the NiAl seedlayer;

sputter depositing a first cobalt chromium tantalum (CoCrTa) magnetic layer on the underlayer;

controlling the angle of incidence to the substrate of impinging atoms during sputter depositing the first CoCrTa magnetic layer to enhance growth of the deposited CoCrTa layer in the perpendicular direction, such that the ratio of perpendicular coercivity over in-plane coercivity of the magnetic recording media is less than about 0.5; and sputter depositing a second magnetic layer on the first CoCrTa magnetic layer.

12. The method according to claim 8, comprising controlling the angle of incidence to the substrate of impinging atoms at no less than about 26°.

13. The method according to claim 12, comprising sputter depositing the first CoCrTa magnetic layer at a thickness of about 2 Å to about 50 Å, wherein the first CoCrTa magnetic layer enhances the (10.0) crystallographic orientation of the second magnetic layer.

14. The method according to claim 12, comprising controlling the angle of incidence to the substrate of impinging atoms at about 26° to about 40°.

15. The method according to claim 11, comprising controlling the angle of incidence to the substrate of impinging atoms at no less than about 26°.

16. The method according to claim 15, comprising controlling the angle of incidence to the substrate of impinging atoms at about 26° to about 40°.

* * * * *